United States Patent [19]

Long, Jr.

[11] 4,105,193

[45] Aug. 8, 1978

[54] SHOCK ABSORBER AND LEVELING UNIT WITH AUXILIARY DAMPING DEVICE FOR VEHICLE SUSPENSIONS

[75] Inventor: Paul J. Long, Jr., Dayton, Ohio

[73] Assignee: General Motors Corporation, Detroit, Mich.

[21] Appl. No.: 744,969

[22] Filed: Nov. 26, 1976

[51] Int. Cl.² ............................................. F16F 9/08
[52] U.S. Cl. .................................. 267/64 R; 188/315
[58] Field of Search ............... 188/269, 284, 298, 315; 267/64 R; 280/704

[56] References Cited

U.S. PATENT DOCUMENTS

| 3,047,284 | 7/1962 | Behles | 267/64 R |
| 3,945,663 | 3/1976 | Duckett | 188/315 |

Primary Examiner—Duane A. Reger
Attorney, Agent, or Firm—Charles R. White

[57] ABSTRACT

Hydraulic shock absorber and pneumatic leveling unit for vehicles which incorporates an auxiliary damping device within the pneumatic height adjuster chamber to provide for supplemental damping of vehicle suspension springs by compressing gas in the chamber and restricting gas flow in subdivisions thereof on compression or rebound stroke of the unit.

5 Claims, 4 Drawing Figures

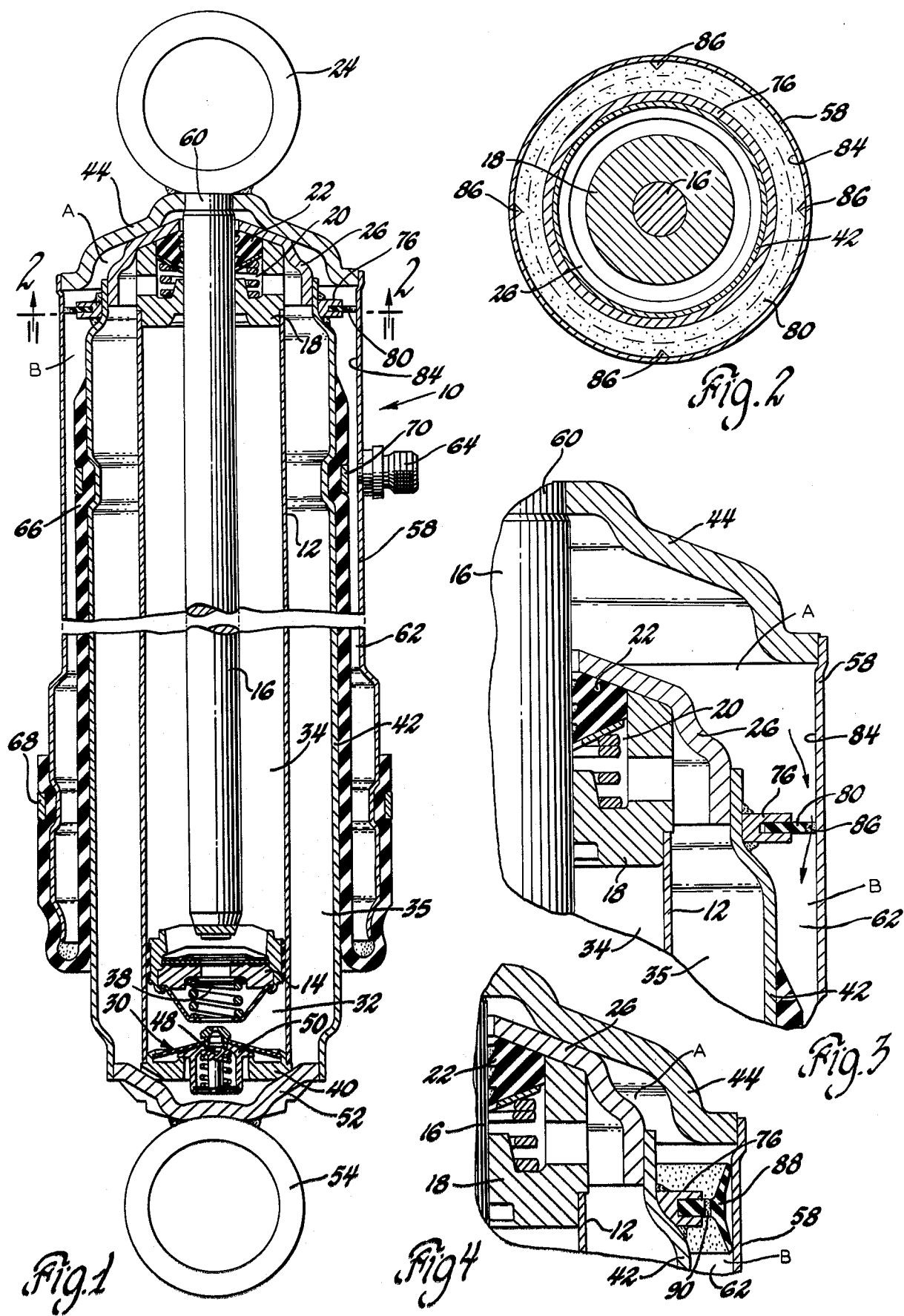

SHOCK ABSORBER AND LEVELING UNIT WITH AUXILIARY DAMPING DEVICE FOR VEHICLE SUSPENSIONS

This invention relates to pneumatically adjustable shock absorbing and leveling units for vehicles and more particularly to such units incorporating an auxiliary pneumatic damping device providing new and improved control of vehicle ride motions.

Prior to the present invention, combination shock absorbing and pneumatic leveling units have been utilized on automotive vehicles to damp and control action of the suspension springs for a wide range of road surfaces and to maintain the proper height of the vehicle under various load conditions. Car body height adjustment is usually through means of an expandable and contractible air chamber or air spring formed by a flexible elastomeric sleeve, a cylindrical shock absorber and a dust tube such as disclosed in the U.S. Pat. Nos. 3,083,701 to P. J. Long, Jr. and 3,339,910 to G. W. Jackson, whose disclosures are hereby incorporated by reference into this application.

While these prior devices have provided important advances in the art, the damping of the motion of a spring suspended vehicle body is through hydraulic shock absorber construction. In contrast to the prior art units this invention, utilizing substantially the same components, incorporates new and improved damping construction within the air spring to provide for additional control of the vehicle suspension springs and thereby the motions of the vehicle body. This new damping construction comprises a special carrier and a floating seal between the upper end of the shock absorber and the dust tube to form a piston device to separate the air chamber into pneumatic subdivisions. As the unit strokes in compression and rebound modes of operation, alternating compression of air in the two subdivisions by the piston device and the bleeding of air between the subdivision provides auxiliary air damping supplemental to the damping of the hydraulic shock absorber to improve vehicle ride. As vehicle load increases, pressure in the air chamber and subdivisions thereof is increased to maintain level height of the vehicle and auxiliary damping capability accordingly increases. Furthermore, this auxiliary damping device is velocity sensitive. Since the capacity of the passage of gas across the auxiliary piston device is fixed, the piston device compresses more gas at higher velocities so that ride motion control is progressively increased as unit stroke velocity is progressively increased. While this invention can be employed on various vehicles, it is of particular advantage on vehicles having a short wheel base to improve and dampen excessive ride motions.

In addition to air damping, air pressure build up in the chambers provides a load build up in the pneumatic leveling unit which adds to the suspension spring load on compression and subtracts from the suspension spring load on rebound. With this supplemental action this invention provides additional and improved control of the vehicle body over road irregularities.

This invention provides new and improved shock absorber and leveling unit for vehicles which incorporates (1) a direct acting shock absorber and (2) a pneumatic chamber expansible and contractible so that the curb height of the vehicle can be maintained for varying vehicle loads and (3) an auxiliary piston device subdividing the pneumatic chamber and controlling the passage of gas between the subdivisions thereof on compression and rebound stroke and acting in conjunction with the shock absorber to provide improved damping of vehicle body motions.

This invention further provides a new and improved shock absorbing and leveling unit for vehicles that incorporates an auxiliary piston device, subdividing a height adjusting expansible and contractible pneumatic chamber, that bleeds and compresses air as the unit strokes to thereby form auxiliary damping of vehicle body motions supplementing the damping provided by the shock absorber of the unit.

This invention further provides a new and improved shock absorber and leveling unit which provides a velocity sensitive auxiliary piston device subdividing an expansible and contractible height adjustment chamber in which the fluid passages through the device restricts the flow of fluid therethrough so that a larger quantity of pneumatic fluid is compressed at higher stroking velocities of the unit to provide for progressively greater damping.

It is a feature, object and advantage of this invention to provide a shock absorber and pneumatically adjustable vehicle leveling unit incorporating a new and improved auxiliary damping mechanism for the suspension springs of a vehicle to supplement the damping provided by the shock absorber of the unit.

It is another feature, object and advantage of this invention to provide an air adjustable shock absorber and leveler unit incorporating a hydraulic shock absorber which has an outer dust tube operatively connected to the shock absorber by a flexible sleeve member to provide an adjustable air chamber and further incorporating an auxiliary piston between the shock absorber and the inner wall of the dust tube for improved damping of the springs of the vehicle suspension.

These and other features, objects and advantages of this invention will become more apparent from the following detailed description and drawing in which:

FIG. 1 is a vertical cross sectional view of a shock absorber incorporating the features of this invention.

FIG. 2 is a cross sectional view taken along line 2—2 of FIG. 1.

FIG. 3 is an enlarged fragmentary view of a portion of the shock absorber of FIG. 1 showing components in a displaced position; and FIG. 4 is an enlarged fragmentary view similar to that of FIG. 3 illustrating a modification of the invention.

Turning now in greater detail to the drawing, there is shown in FIG. 1 a shock absorber and leveling unit 10 consisting of an inner pressure cylinder 12 containing oil and a movable valved piston 14 carried on the inner end of a reciprocating rod 16. The reciprocating rod 16 extends upwardly from piston 14 through a rod guide member 18 secured to the upper end of the cylinder 12. The rod guide member 18 has a chamber 20 that receives an annular rod seal 22 which engages the outer periphery of the rod and seals against the loss of hydraulic fluid from the unit 10. The projecting end of the rod 16 carries a fitting 24 adapted to be attached to the sprung mass or chassis of the vehicle to thereby secure the upper end of the unit 10 to the vehicle. The seal chamber 20 is closed by a centrally apertured and cup-shaped cap member 26 that also holds the rod seal 22 within the chamber 20.

The bottom end of the pressure cylinder 12 is closed by a base valve structure 30 so that a compression chamber 32 is formed between the base valve 30 and the piston 14. A rebound chamber 34 is formed between the piston 14 and the rod guide 18.

The piston 14 is provided with a compression control valve 36 on the upper side of the piston to regulate flow of hydraulic fluid from the compression chamber 32 into the chamber 34 on the compression stroke of the piston 14 towards the base valve 30. On this compression stroke excess hydraulic fluid is delivered through the base valve into a reservoir chamber 35 surrounding the pressure cylinder 12.

On the opposite side of the piston 14 there is provided a rebound valve 38 that controls flow of hydraulic fluid from rebound control chamber 34 and the reservoir into compression chamber 32 when the piston, in its rebound stroke, moves upwardly from the base valve 30. The base valve 30 is secured to a closure cap 40 that in turn is secured within one end of a cylindrical reservoir tube 42 surrounding the cylinder tube 12 and coaxially spaced therefrom to form the reservoir chamber 35. The upper end of the reservoir tube 42 is fixedly attached to the closure cap 44 thereby closing the upper end of the reservoir chamber 35.

The base valve 30 has a valve member 48 that controls the flow of hydraulic fluid from the compression chamber 32 into the reservoir chamber 35 on movement of the piston 14 towards the base valve 30. The base valve also includes a valve member 50 that provides for relatively free flow of hydraulic fluid from the reservoir chamber 35 back into the compression chamber 32 on rebound on movement of the piston 14 from the base valve. A closure cap 52 fixed to the lower end of the reservoir tube 42 carries a fitting 54 for attaching the lower end of the shock absorber to the unsprung mass, or wheels and axle structure, of the vehicle.

The action of a shock absorber in damping vehicle motions is described in U.S. Pat. No. 2,655,233 issued Oct. 13, 1953 to Funkhouser et al whose disclosure is hereby incorporated by reference.

The air spring assembly of unit 10 includes a rigid outer cylinder or dust tube 58 that is secured in an air tight manner at its upper end to the closure cap 44. The cap 44 is fitted on a reduced diameter portion 60 of rod 16 with the juncture between the rod 16 and the cap 44 being fluid tight. The outer cylinder 58 has an axial length that is at least equal to the stroke of reciprocation of the piston 14 in the cylinder 12. The outer cylinder 58 is also coaxial with the reservoir tube 42 and is spaced therefrom to form part of an air chamber 62 that is adapted to be pneumatically pressurized through a fitting 64. While the outer cylinder 58 is closed at its top by a cap 44, the bottom end of this component is spaced with respect to the reservoir tube 44 as shown in FIG. 1. The bottom end of the outer cylinder 58 is closed by a tubular sleeve 66 of a resilient elastomeric material. One end of the elastomeric sleeve 66 is secured in an air tight manner to the lower end of the outer cylinder 58 by a circular metallic clamp 68. From clamp 68 the resilient sleeve 66 extends downwardly along the outer periphery of cylinder 58 and is reversely curved around the free end of this component onto the outer periphery of the reservoir tube 42. The end of the internal portion of elastomeric sleeve 66 is secured in an air tight manner to the upper portion of the reservoir tube 42 by a circular metallic clamp 70. The longitudinally expansible and contractible air chamber 62 is thus formed to provide for vehicle height adjustment. Generally two height adjusting and shock absorbing units are employed with the rear suspension of a vehicle and the air chambers of each unit are interconnected with one another. By supplying air pressure into chamber 62 through fitting 64 from a suitable source, the air chambers can be expanded and lengthened as more fully described in the U.S. Pat. Nos. 3,063,701 and 3,339,910 referenced above to compensate for additional load imposed upon the vehicle so that the curb height will be maintained. Conversely as loads are decreased, such as when the vehicle is unloaded, the pressure is relieved from the chamber 32 so that the unit will contract to thereby maintain the desired curb height.

This invention importantly provides additional damping to supplement the damping action of the piston 14 as it strokes in the oil filled pressure chamber 12 on the rebound and compression strokes. To this end, it will be seen from FIG. 2 that the upper end of the reservoir tube 42 has a circular carrier 76 welded or otherwise secured thereto. This carrier has a radially extending annular groove formed therein in which annular floating seal 80 is mounted. The seal 80 extends radially outwardly into engagement with the inner cylindrical surface 84 of the outer cylinder 58 to form a piston device separating chamber 62 into subdivisions A and B. It will be appreciated that as the unit 10 strokes in rebound and compression, the seal operates as a pneumatic piston to alternately compress the air in chambers A and B respectively. As shown in FIG. 2, the seal 80 is formed with peripheral notches 86 to restrict the air flowing between the subdivisions A and B when the unit strokes on rebound and compression. In FIG. 3, for example, on compression stroke of the shock absorber, air in subdivision A is compressed and fed, as shown by the flow arrow, into subdivision B to provide auxiliary damping. Conversely, on rebound stroke, air in subdivision B will be compressed and fed into subdivision A of the air chamber 62. The orifices have limited capacity so that more air is compressed at higher stroking velocities to thereby provide for increased auxiliary damping. Furthermore, as vehicle load increases pressure in the chamber 62, auxiliary damping by the piston device correspondingly increases.

FIG. 4 discloses an additional embodiment of the invention wherein the carrier 76 supports a lip type seal 88 of a suitable flexible plastic material in a manner similar to that described in connection with FIG. 2. Improved sealing of subdivisions A and B is provided by the flared lip of the seal member. Air is bled through the axial lead passages 90 formed in the seal on the rebound and compression strokes of the unit in a manner similar to that described in connection with the FIG. 2. If desired, an air pressure relief can be added to the air damping device of this invention. The relief function can be readily accomplished by allowing the seal to deflect or by incorporating separate relief valves in the seal separating chambers A and B.

This invention further improves the action of vehicle spring suspension in response to air pressure build up in the chambers. On compression, the unit telescopes toward a closed position and load build up in subchamber B adds to the suspension load; on rebound the unit moves to an expanded position and air pressure build up in chamber B subtracts from the suspension spring load to thereby provide improved control of vehicle body ride motions over rough and irregular roadways. U.S. Pat. No. 3,606,375 issued Sept. 20, 1971 to G. W. Jackson for "Electric Controller for Vehicle Leveling System" illustrates air spring shock absorbers used in conjunction with vehicle suspension springs and this patent disclosure is hereby incorporated by reference.

While the invention has been described in connection with a preferred specific embodiment thereof, it will be appreciated that various modifications of this construction can be made in light of this description and without departing from the spirit of the disclosure or the scope of the following claims:

I claim:

1. A shock absorbing and height adjusting unit for an automotive vehicle comprising a double acting shock absorber having primary piston means reciprocably mounted in an oil filled pressure cylinder having rebound and compression strokes for damping the ride motions of the vehicle, reservoir means secured to and disposed around said pressure cylinder and providing a space for receiving oil from said pressure cylinder on the compression stroke of said primary piston means, an outer cylinder fixed to said piston means radially spaced from and disposed around said reservoir means, a resilient tubular sleeve operatively connected to said outer cylinder and to said reservoir means providing a pneumatically adjustable gas chamber containing a gas and forming a gas spring for adjusting the curb height of the vehicle body, secondary piston means reciprocably movable in said gas chamber for subdividing said gas chamber into separate sections and for alternately compressing the gas in at least one of said sections in response to the compression stroke of said shock absorber and in another of said sections in response to the rebound stroke of said shock absorber thereby providing auxiliary damping means to supplement the damping action of said primary piston means.

2. A shock absorbing and height adjusting unit for an automotive vehicle comprising a double acting shock absorber, said shock absorber having an oil filled pressure cylinder and primary piston means mounted in said pressure cylinder for movement in rebound and compression strokes to damp the ride motions of the vehicle body, a pneumatically adjustable gas chamber having an outer wall concentric with said pressure cylinder forming a gas spring for adjusting the curb height of the body of the vehicle and secondary piston means secured to said shock absorber reciprocably movable in said gas chamber and slidably engaging said outer wall of said gas chamber for subdividing said gas chamber into separate sections and for alternately compressing the gas in at least one of said sections in response to the compression stroke of said shock absorber and in another of said sections in response to the rebound stroke of said shock absorber thereby providing auxiliary damping means to supplement the damping action of said primary piston means.

3. A shock absorbing and height adjusting unit operatively connected between the sprung and unsprung masses of a vehicle comprising an inner tubular member operatively connected to one of said masses and having a quantity of oil contained therein, primary piston means operatively connected to the other of said masses and mounted for reciprocal movement in said inner tubular member and further separating said tubular member into a compression chamber and a rebound chamber, valve means in said piston means for controlling the flow of fluid from one of said chambers to the other of said chambers to damp the relative movement of said sprung and unsprung masses of the vehicle, an intermediate tubular member disposed around and in spaced relationship to the inner tubular member to provide a reservoir for said oil in said inner tubular member, valve means closing one end of said inner tubular member and providing for the hydraulic fluid flow between said pressure chamber and said reservoir in response to the movement of said piston means in said inner tubular member, outer tube means operatively connected to said piston means and spaced outwardly from said intermediate tubular member, an elastomeric sleeve secured to said intermediate tubular member and to said outer tube means to define an expansible and contractible pneumatic chamber therebetween, means to supply and exhaust pressure fluid to said pneumatic chamber to selectively adjust the height between the sprung and unsprung masses of said vehicle, and secondary piston means operatively disposed between said intermediate tubular member and said outer tube means for compressing pneumatic fluid within said pneumatic chamber in response to the telescoping movement of said primary piston means to provide damping means supplementing that provided by said primary piston means.

4. A shock absorbing and height adjusting unit operatively connected between the sprung and unsprung masses of a vehicle comprising an inner tubular member operatively connected to one of said masses and having a quantity of oil contained therein, primary piston means operatively connected to the other of said masses and mounted for reciprocal movement in said inner tubular member and further separating said tubular member into a compression chamber and a rebound chamber, valve means in said piston means for controlling the flow of fluid from one of said chambers to the other of said chambers to damp the relative movement of said sprung and unsprung masses of the vehicle, an intermediate tubular member disposed around and in spaced relationship to the inner tubular member to provide a reservoir for said oil in said inner tubular member, valve means closing one end of said inner tubular member and providing for the hydraulic fluid flow between said pressure chamber and said reservoir in response to the movement of said piston means in said inner tubular member, dust tube means operatively connected to said piston means and spaced outwardly from said intermediate tubular member, an elastomeric sleeve secured to said intermediate tubular member and to said dust tube means to define a longitudinally expansible and contractible chamber therebetween, means to supply and exhaust pressure fluid to said pneumatic chamber to selectively effect the elongation and contraction of said unit to adjust the height between the sprung and unsprung masses of said vehicle, and radially extending secondary piston means operatively disposed between said intermediate tubular member and said dust tube means for subdividing said pneumatic chamber and to control the flow of pneumatic fluid between the subdivision of said pneumatic chamber in response to the telescoping movement of said primary piston means to thereby provide damping means in addition to that provided by said primary piston means.

5. For use in automotive suspension systems in association with suspension springs, a telescopic shock absorber and air damper unit operatively connected between the sprung and unsprung portions of a vehicle body comprising a shock absorber having primary piston means reciprocably mounted in an oil filled pressure cylinder having rebound and compression strokes for damping the motions of the spring suspended vehicle body, a flexible body disposed around the pressure cylinder having a gas therein and forming a gas chamber, secondary piston means operatively connected to said pressure cylinder for reciprocating movement in said gas chamber and for subdividing said gas chamber into separate sections and linearly movable therein in response to movement of the vehicle body to provide a load build up in one of the sections to add to the suspension spring load on the compression stroke and to subtract from the suspension spring load on the rebound stroke to thereby provide additional control of the vehicle body as the vehicle traverses irregular support surfaces.

* * * * *